US007723676B2

(12) United States Patent
Vilkov et al.

(10) Patent No.: US 7,723,676 B2
(45) Date of Patent: May 25, 2010

(54) METHOD AND APPARATUS FOR ION FRAGMENTATION IN MASS SPECTROMETRY

(75) Inventors: Andrey Vilkov, Columbia, MD (US); Vladimir M. Doroshenko, Sykesville, MD (US)

(73) Assignee: Science & Engineering Services, Inc., Columbia, MD (US)

( * ) Notice: Subject to any disclaimer, the term of this patent is extended or adjusted under 35 U.S.C. 154(b) by 329 days.

(21) Appl. No.: 11/959,006

(22) Filed: Dec. 18, 2007

(65) Prior Publication Data

US 2009/0152458 A1 Jun. 18, 2009

(51) Int. Cl.
*H01J 49/00* (2006.01)
*B01D 59/44* (2006.01)

(52) U.S. Cl. ....................... 250/281; 250/282; 250/288; 250/286; 250/423 R; 250/424

(58) Field of Classification Search ................ 250/281, 250/282, 288, 286, 423 R, 424
See application file for complete search history.

(56) References Cited

U.S. PATENT DOCUMENTS 7,170,052 B2 * 1/2007 Furutani et al. ............. 250/287
7,397,029 B2 * 7/2008 Berkout et al. .............. 250/288
7,534,622 B2 * 5/2009 Hunt et al. .................. 436/173

* cited by examiner

*Primary Examiner*—Nikita Wells
(74) *Attorney, Agent, or Firm*—Oblon, Spivak, McClelland, Maier & Neustadt, L.L.P.

(57) ABSTRACT

A method for fragmentation of analyte ions for mass spectroscopy and a system for mass spectroscopy. The method produces gas-phase analyte ions, produces gas-phase radical species separately from the analyte ions, and mixes the gas-phase analyte ions and the radical species at substantially atmospheric pressure conditions to produce fragment ions prior to introduction into a mass spectrometer. The system includes a gas-phase analyte ion source, a gas-phase radical species source separate from the gas-phase analyte ion source, a mixing region where the gas-phase analyte ions and the radical species are mixed at substantially atmospheric pressure to produce fragment ions of the analyte ions, a mass spectrometer having an entrance where at least a portion of the fragment ions are introduced into a vacuum of the mass spectrometer, and a detector in the mass spectrometer which determines a mass to charge ratio analysis of the fragment ions.

70 Claims, 8 Drawing Sheets

METHOD AND APPARATUS FOR ION FRAGMENTATION IN MASS SPECTROMETRY

STATEMENT REGARDING FEDERALLY SPONSORED RESEARCH

The U.S. Government has a paid-up license in this invention and the right in limited circumstances to require the patent owner to license others on reasonable terms as provided for by the terms of grant 1R43RR023224-01 awarded by the National Institute of Health.

BACKGROUND OF THE INVENTION

1. Field of the Invention

This invention is related to methods and systems for gas phase sample preparation and introduction into a mass analysis unit.

2. Description of the Related Art

Tandem mass spectrometry (MS/MS) currently plays a central role in the identification and characterization of proteins. Successful mass spectrometric analysis of peptides and proteins relies on the ability to systematically dissect peptide backbone bonds (MS/MS). Conventional MS/MS methods, using collision-activated dissociation (CAD) where ion fragmentation is activated by collisions with buffer gas, fail in this regard if the peptide is too long (approximately >20) residues or contains either labile post-translational modifications or multiple basic residues. Moreover, while intact proteins can be dissociated with CAD, this process routinely produces only a few backbone cleavages making sequence identification challenging.

A different method (compared to CAD) for peptide ion dissociation referred to as electron capture dissociation (ECD) has been developed. In that work, low energy electrons are reacted with peptide cations in the magnetic field of a Fourier transform ion cyclotron resonance MS (FT-ICR-MS). The reaction results in the attachment of electrons to the protonated peptides producing peptide cations containing an additional electron. The odd electron peptide then undergoes very rapid (i.e., femtoseconds) rearrangement with subsequent dissociation. Unlike the collision-activated process, ECD does not cleave chemical modifications from the peptide, but rather induces random breakage of the peptide backbone cleavage that is indifferent to either peptide sequence or length. ECD fragmentation is not limited by the size of the peptide being analyzed. Up to now, fragmentation by ECD could only be performed in expensive (FT-ICR) mass spectrometer.

A further method of fragmentation, known as electron-transfer dissociation (ETD), has been recently introduced. In this method, ECD-like reactions are obtained using negatively charged ions (anions) as vehicles for electron delivery. Given the appropriate anion, the reaction should proceed to donate an electron to the peptide. Subsequently, the peptide would contain an extra electron, and that inclusion of an extra electron is expected to induce peptide backbone fragmentation, just as in ECD. Gas phase peptide cations and small organic anions react rapidly with easily controlled duration and timing. As in ECD, labile post-translational modifications remain intact, while peptide backbone bonds are cleaved with relatively little concern to peptide sequence, charge, or size. Unlike ECD, electron-transfer dissociation (ETD) can be performed with lower-cost bench-top mass spectrometers on a time scale that permits coupling with online chromatographic separations. ETD, however, has two analytical disadvantages compared to ECD: (1) ETD efficiency for doubly charged precursors is lower than with ECD; (2) ETD, which is less energetic, does not induce secondary fragmentation, thus rending the possibility to distinguish the isomeric Leu and Ile residues.

One alternative method for peptide ion dissociation with fragmentation patterns similar to ECD/ETD techniques has been developed. In this method, the peptide cations and anions are stored in radiofrequency (RF) ion traps and irradiated by a beam of metastable species (Ar or He) generated by glow discharged source Fast Atom Bombardment (FAB) gun. These metastable (neutral) species can donate an electron to the peptide cation inducing peptide backbone cleavage the same way as in ECD. An interaction of metastable species with negative peptide ions results in a transfer of electronic excitation and subsequent detachment of an electron from the anion inducing peptide fragmentation. Similar to ECD and ETD, the metastable-induced dissociation does not cleave chemical modifications from the peptide, but rather induces random breakage of the peptide backbone. The major advantage of metastable-induced dissociation is its simplicity. The neutral metastable species can be easily introduced through RF field to the areas where peptide ions are located. However, this method (at least in the current configurations) also encounters problems related to the fragmentation efficiency that is significantly lower than in the conventional ETD.

Background references to these techniques and others related to ion/ion and ion/molecule reactions at high pressure and atmospheric pressure photoionization are listed below, the entire contents of which are incorporated herein by reference.

1. Kaiser, R. E. et al *Rapid Comm. Mass Spectrom.* 1990, 4, 30);

2. Baba, T. et al *Chem.* 2004, 76, 4263-4266;

3. Zubarev, R. A. et al *J. Am. Chem. Soc.* 1998, 120, 3265-3266;

4. Syka, J. E. P. et al *PNAS* 2004, 101, 9528-9533;

5. Pitteri, S. J. et al. *Anal. Chem.* 2005, 77, 5662-5669;

6. Chrisman, P. A. et al *J. Am. Soc. Mass Spectrom.* 2005, 16, 1020-1030;

7. Zubarev, R. A., *Principles of mass spectrometry applied to biomolecules,* ed. J. Laskin and C. Lifshitz. 2007: Wiley;

8. Misharin, A. S. et al. *Rapid Comm. Mass Spectrom.* 2005, 19, 2163-2171;

9. Berkout, V. D., *Anal. Chem.* 2006, 78(9), 3055-3061;

10. Sparkman O. D. et al, US Pat. Appl. Publ. No. US 2006/0250138 A1;

11. Ogorzalek Loo, R. R. et al *J. Am. Soc. Mass Spectrom.* 1992, 3, 695-705;

12. Pui, D. Y. H. et al U.S. Pat. No. 5,992,244;

13. Stephenson, et al *J. Mass Spectrom.* 1998, 33 664-672;

14. Ebeling, D. D. et al *Anal. Chem.* 2000, 72, 5158-5161;

15. Ebeling, D. D. et al U.S. Pat. 6,649,907);

16. Whitehouse, G. et al. U.S. Patent Application Pub. No 2006/0255261;

17. Delobel, A. et al *Anal. Chem.* 2003, 75, 5961-5968;

18. Debois, D. et al J. Mass Spectrom. 2006, 41, 1554-1560); and

19. Demirev, P. A., *Rapid Comm. Mass Spectrom.* 2000, 14, 777.

SUMMARY OF INVENTION

In one embodiment of the invention, there is provided a method for fragmentation of analyte ions for mass spectroscopy. The method produces gas-phase analyte ions, produces gas-phase radical species separately from the analyte ions, and mixes the gas-phase analyte ions and the radical species at substantially atmospheric pressure conditions to produce fragment ions prior to introduction into a mass spectrometer.

In one embodiment of the invention, there is provided a system for mass spectroscopy. The system includes a gas-phase analyte ion source, a gas-phase radical species source separate from the gas-phase analyte ion source, a mixing region where the gas-phase analyte ions and the radical species are mixed at substantially atmospheric pressure to produce fragment ions of the analyte ions, a mass spectrometer having an entry where at least a portion of the fragment ions are introduced into a vacuum of the mass spectrometer, and a detector in the mass spectrometer which determines a mass to charge ratio analysis of the ions introduced into the vacuum of the mass spectrometer.

It is to be understood that both the foregoing general description of the invention and the following detailed description are exemplary, but are not restrictive of the invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
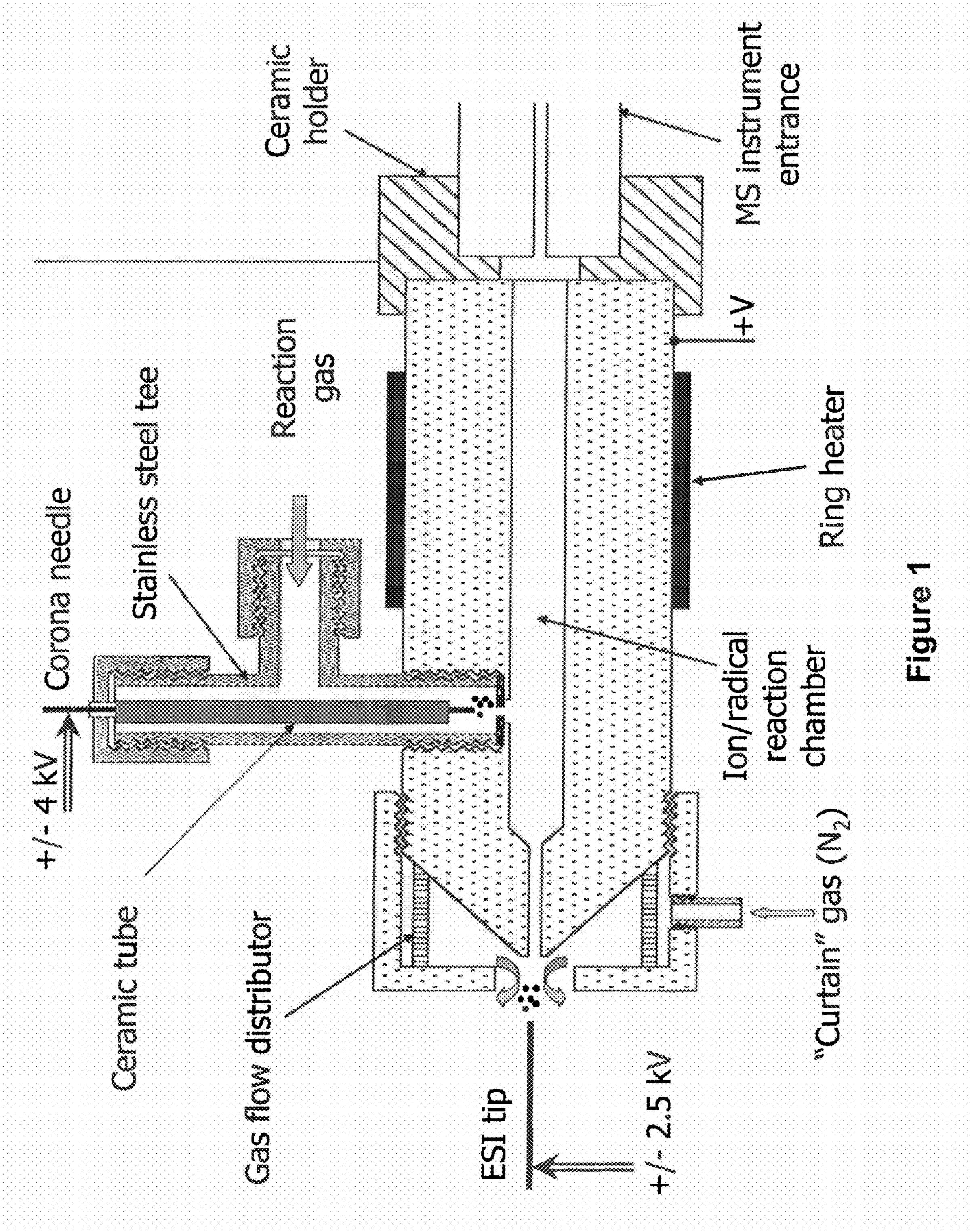
FIG. 1 is a schematic diagram of an apparatus in accordance with the invention.

The present invention relates to a novel method for fragmenting ions within an ion source maintained substantially at atmospheric pressure through the use of reactions in a gas phase between analyte ions and radical species. The fragmentation occurs as a result of interaction of the analyte ions with the gas-phase radical species produced separately from the analyte ions. In the specific case of peptide analyte ions, the invention promotes fragmentation along the peptide backbone and makes it possible to deduce the amino acid sequence of the sample. This invention can be used in any type of mass spectrometer including quadrupole, ion trap, Time-of-Flight, Orbitrap and Fourier Transform Ion Cyclotron Resonance instruments.

Specific radical species serve as "collisional partners" to produce ion ECD-like fragments at elevated pressures. Separate generation of analyte and radical species permits precise control and optimization of conditions of their production. While the following description references analyte ion production from peptides and proteins, but other types of biomolecules, for instance DNA, RNA, lipids, or metabolites can be used for analyte ion production. Suitable radical species for stimulating analyte ion production include but are not limited to reactive oxygen species such as singlet oxygen, hydroxyl, hydrogen peroxide and superoxide radicals, and other odd-electron species.

In one embodiment, the analyte ions can be generated by electrospay ionization (ESI), atmospheric pressure chemical ionization (APCI), atmospheric pressure matrix-assisted laser desorption ionization (AP-MALDI), direct analysis in real time (DART) ion source, desorption electrospray ionization (DESI), or APPI ionization methods from gas, liquid or solid samples with either positive or negative polarity.

In one embodiment, the radical species (either charged or neutral) can be produced separately from the analyte ions through any type of electrical discharge or photoionization processes. Mixing the analyte ions and the radical species can be optimized to enhance either the analyte ions or the radical species concentration.

In one embodiment, the analyte ions and radical species are mixed in a flow reactor located in the front of an atmospheric inlet orifice of a mass spectrometer (i.e., in a mixing region). In this embodiment, the time allowed for interaction between the analyte and radical species is dictated by geometry of the flow reactor and gas flow rate throughout the entrance orifice of the mass spectrometer used.

In one embodiment, additional activation occurs by way of supplying activation energy to the analyte ions in collisions with a background gas having an elevated temperature. The additional activation of the analyte ions can be conducted before or after the step of mixing of the analyte ions with the radical species.

It is advantageous if analyte ions of one type are separated from other ions produced in the ion source before the fragmentation occurs since this can significantly facilitate the identification of the analyte ions and their structures. In one embodiment, an additional step selects the analyte ions using, for example, gas or liquid-phase chromatography methods and ion mobility or field-asymmetric ion mobility methods, either separately or in combination.

Referring now to the drawings, wherein like reference numerals designate identical or corresponding parts throughout the several views, FIG. 1 is a schematic diagram of a mass spectrometer system 10 according to one embodiment of the invention. System 10 includes in general a gas-phase analyte ion source (e.g., ESI source 20), a gas-phase radical species source (e.g., corona discharge 30) separate from the gas-phase analyte ion source, and a mixing region (e.g. reaction chamber 40) where the gas-phase analyte ions and the radical species are mixed at substantially atmospheric pressure to produce fragment ions of the analyte ions. System 10 includes a mass spectrometer section 50 having an entrance 52 where at least a portion of the fragment ions are introduced into a vacuum of the mass spectrometer section 50. The mass spectrometer section 50 includes a detector 54 which determines performs a mass to charge ratio analysis on the ions introduced into the vacuum of the mass spectrometer section 50.

In the particular embodiment shown in FIG. 1, analyte ions are produced by electrospay ionization ESI 20 serving as the gas-phase analyte ion source, and the radical species are produced by corona discharge 30 serving as the gas-phase radical species source. The analyte ions and radical species are mixed together within for example stainless steel reaction chamber 40 serving as the mixing region. In the particular embodiment shown in FIG. 1, the internal diameter of the flow reactor is smaller at the entrance of the flow reactor (e.g., 0.5 mm i.d.) and larger at the mixing region (e.g., 2.5 mm i.d.). The invention is not so limited to these dimensions, but utilizes in various embodiments dimensions configured ed (?) to cause a minimal pressure drop through the reactor,—in comparison to the majority of the pressure drop occurring at the long and narrow capillary of MS instrument, serving as entrance 52. In the configuration shown in FIG. 1, a pressure drop of a few mTorr is expected along the length of the reaction chamber 40, while a pressure drop of 100's of Torr is expected across the capillary of the MS instrument. The geometry of the flow reactor defines the gas flow velocity through the reaction chamber 40 thus determining the ion-radical interaction time.

Standard cartridge heaters (e.g., available from McMaster-Carr, Dayton, N.J.) can be used to vary the temperature of the flow reaction chamber 40, typically controlled in the range of 20-500° C. The temperature of the reaction chamber 40 can be measured by an inserted thermocouple and controlled by a temperature controller (e.g., Model CN9110A, Omega Engineering, Stamford, Conn.). The temperature of the gas flowing through the corona discharge can be adjusted separately using a coiled tube wrapped with band heaters (e.g., available from McMaster-Carr, Dayton, N.J.). The front-end of the reaction chamber 40 has in one embodiment a counter-current flow of "curtain" gas (typically, nitrogen at 0.2-5 l/min flow rates) to aid in desolvation of droplets generated by ESI and to sweep away unwanted neutral species from the reactor entrance aperture.

The flow reactor is seated onto the heated capillary 52 of MS instrument 50 (e.g., a MS instrument from LCQ Classic, Thermo Finnigan, San Jose, Calif.) with a ceramic holder that seals and provides a distance separation (e.g., about 0.5 mm) between the body of the reaction chamber 40 and the MS heated capillary. To improve ion transmission through the reaction chamber 40 into MS instrument 50, a variable DC voltage can be applied to the body of reaction chamber 40.

The corona discharge region 30 in FIG. 1 is used for radical generation, although other sources can be used. In FIG. 1, a metal tee (identified as a stainless steel tee) is installed into the stainless steel body of the reaction chamber 40. The top end of the tee connector holds the depicted ceramic tube with the depicted corona needle (e.g., a platinum wire) inside. The "swagelock"-type side port of the tee connector is used to provide a constant flow of reagent gas through to the radical species source 30. Other types of plumbing line connections can be used. The platinum wire (typically 0.10 mm dia.) is held at potential of a few kilovolts (typically 2 kV) relative to the potential of the flow reactor. Other wire materials such as for example refractory wire materials can be used. The corona discharge serving as the radical species source 30 is created between a sharpened tip of the platinum wire and a stainless steel disk 34 depicted at the base of the radical species source 30 and having for example a small orifice (typically 1 mm) separating the radical species source 30 from the reaction chamber 40. The disk 34 as shown in FIG. 1 can sit in a counter bore made in the body of the reaction chamber 40.

A gas flow meter not shown in FIG. 1 (e.g., a T-type meter, available from Aalborg, Orangeburg, N.Y.) can be used to control a flow rate (typically 0-500 cc/min) of reaction gas through corona discharge region 30. The reaction gas, used to generate radical species, can be produced by passing a carrier gas (e.g., nitrogen or another gas such as an inert gas) through the liquid sample (e.g., water or hydrogen peroxide).

In an activation step, activation energy is supplied to the analyte ions in collisions with a background gas at an elevated temperature. The activation of the analyte ions can be conducted before or after or simultaneously with the step of mixing of the analyte ions with the radical species. The activation step can be used to decompose intermediate products formed in the interaction of the analyte ions with the radical species to enhance desired fragmentation pathways.

The electrospray ionization source 20 in FIG. 1 is utilized to produce positively and negatively charged ions of peptide and proteins. A gas flow meter not shown in FIG. 1 (e.g., the T-type meter discussed above) can be used to control a flow rate (typically 0.2-5 l/min) of the curtain gas shown in FIG. 1. A source of the gas-phase analyte ions can come from proteins, peptides, DNA, RNA, lipids, polysaccharides, and metabolite products. Samples of these materials in a liquid form are injected from the 2.5 kV needle shown in FIG. 1 and are ionized in the presence of the electric field present about the needle.

Figure 2:
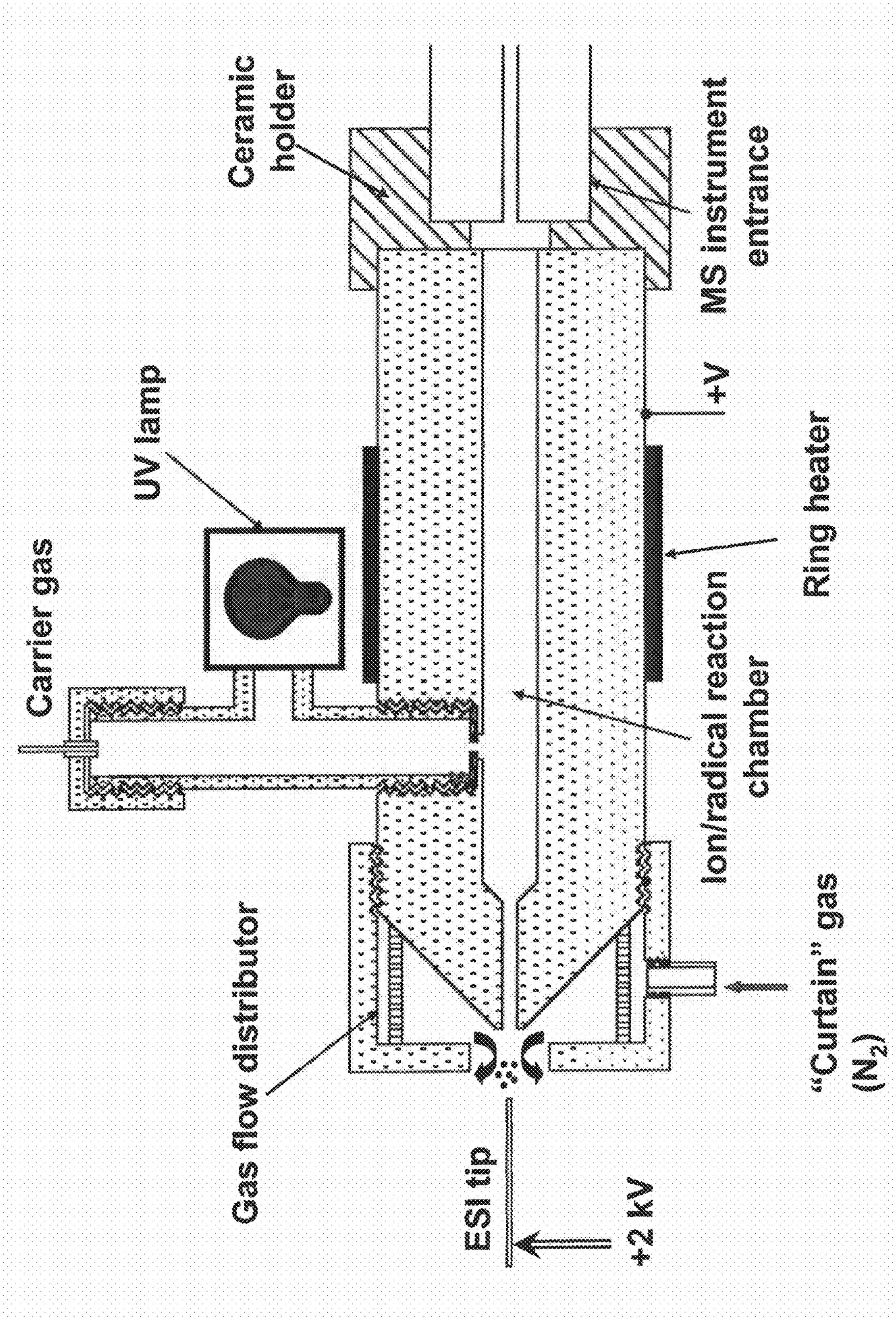
FIG. 2 is a schematic diagram of a similar apparatus but with the difference that that radicals are generated by photoionization using UV lamp.

Another embodiment of the invention is shown in FIG. 2 where the corona discharge source 30 is replaced with a UV light source 32 serving as the radical source. In this embodiment, radicals are generated from the reagent gas through photoionization (either directly or in following chemical reactions) from the UV photons emitted from the discharge lamp. Otherwise, the corresponding components between FIGS. 1 and 2 function similarly.

Various methods can be used for controlling an on/off state of the radical source to allow switching between the mass analysis of the analyte ion and the mass analysis of the fragment ions. For example, an electronic switch can quickly energize/de-energize the source for generation of the radical species, for instance by cutting the current going through the electric discharge or UV lamp to provide the rapid switching.

Figure 3:
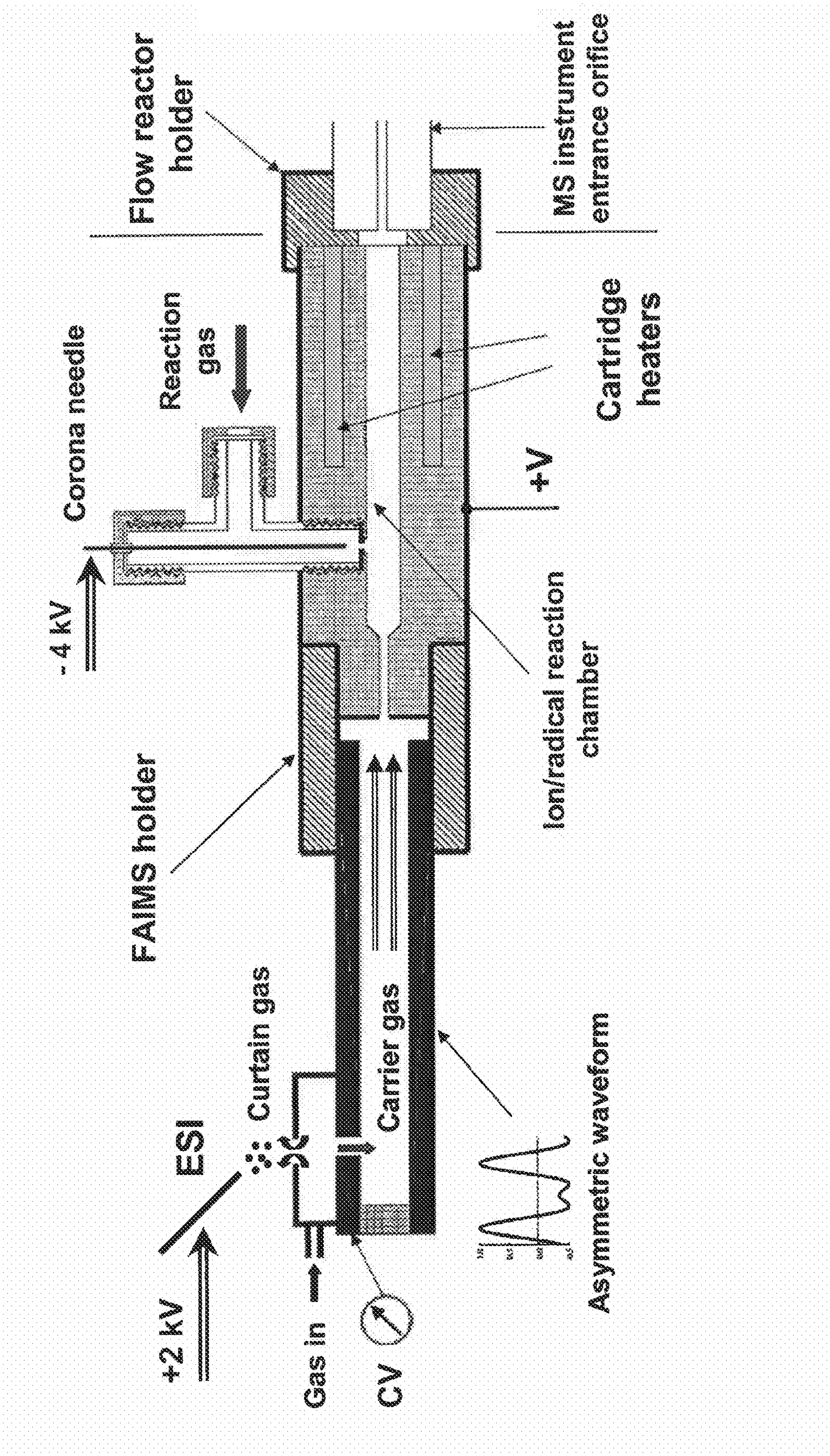
FIG. 3 is a schematic diagram of an apparatus similar to the one shown in FIG. 1 but with a Field Asymmetric Waveform Ion Mobility Spectrometry (FAIMS) interface added between the electrospray source and the flow reactor.

Various embodiments of the invention include (as shown in FIG. 3) an ion separation device 60 located between the atmospheric ion source (ESI source 20) and the mixing region (i.e., reaction chamber 40 to selectively isolate an analyte ion of interest. A variety of ion separation devices can be used including gas- and liquid-phase separation techniques such as reversed-phase liquid chromatography (RPLC), capillary isoelectric focusing (CIEF) or ion mobility spectrometry (IMS), and can be employed either separately or in combination.

One example of this embodiment is schematically depicted in FIG. 3, where the analyte ions are separated using Field Asymmetric Waveform Ion Mobility Spectrometry (FAIMS) 60, which separates ions based on a number of their physical properties including their charge state and molecular conformation. The FAIMS interface is located in the front of the mixing chamber 40 and may have either cylindrical or planar geometry.

The mass spectrometers shown in FIGS. 1-3 are not limited to any particular mass spectrometer. Indeed, any type of mass spectrometers, including quadrupole, ion trap, Time-of-Flight, Orbitrap and Fourier Transform Ion Cyclotron Resonance instruments can be used.

EXAMPLES

Results are shown in FIGS. 4-7 for spectra obtained using the configuration of FIG. 1.

Figure 4:
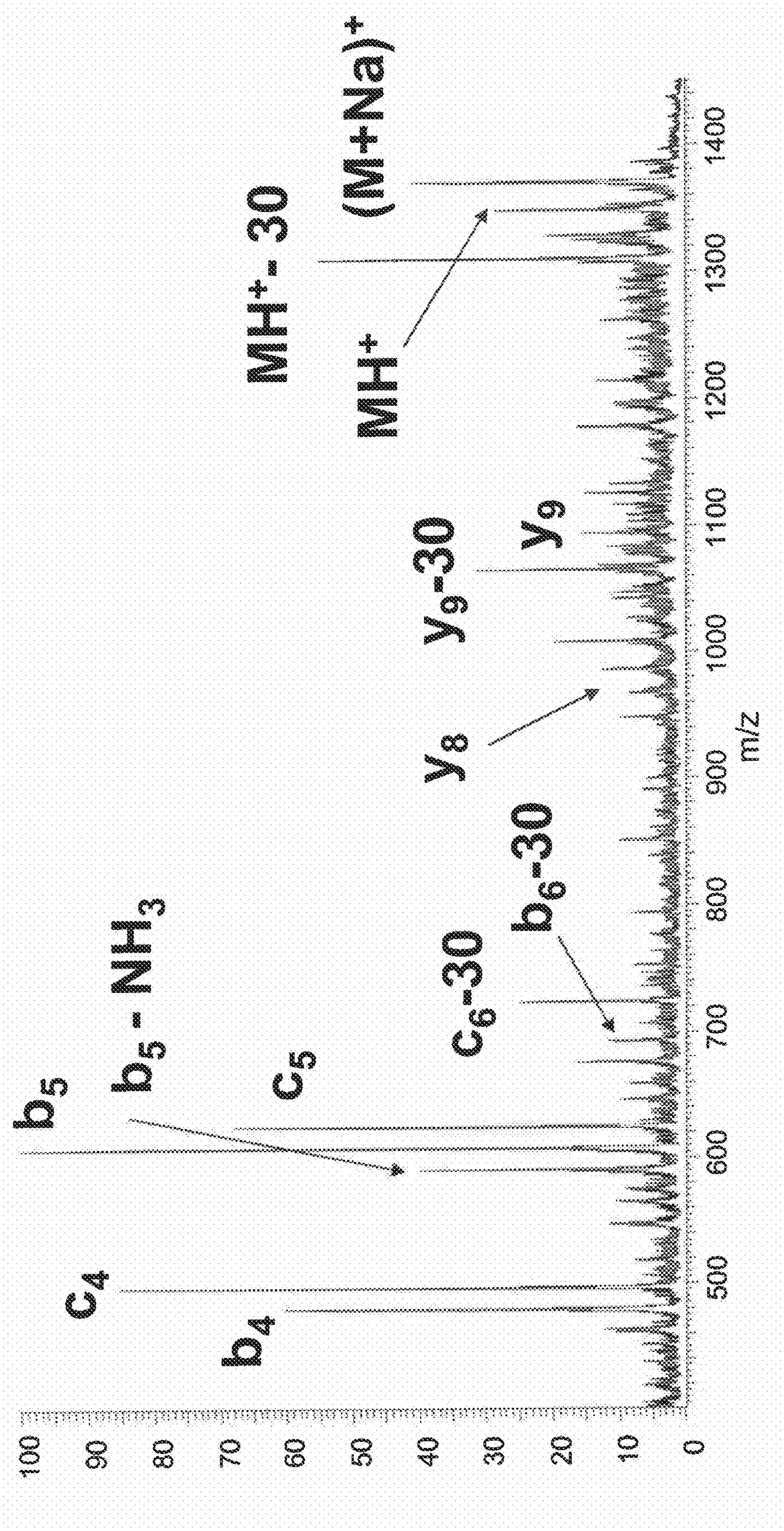
FIG. 4 is a fragment ion mass spectrum of substance P obtained in accordance with this invention.

FIG. 4 is a fragment ion mass spectrum of substance P obtained using a three-dimensional ion trap as the mass spectrometer and by adding together 50 mass scans. The corona discharge and electrospray had positive polarity. The flow reactor was maintained at the temperature of 420° C. The flow of the carrier gas (pure nitrogen) through the radical source was 280 cubic centimeters per minute.

Figure 5:
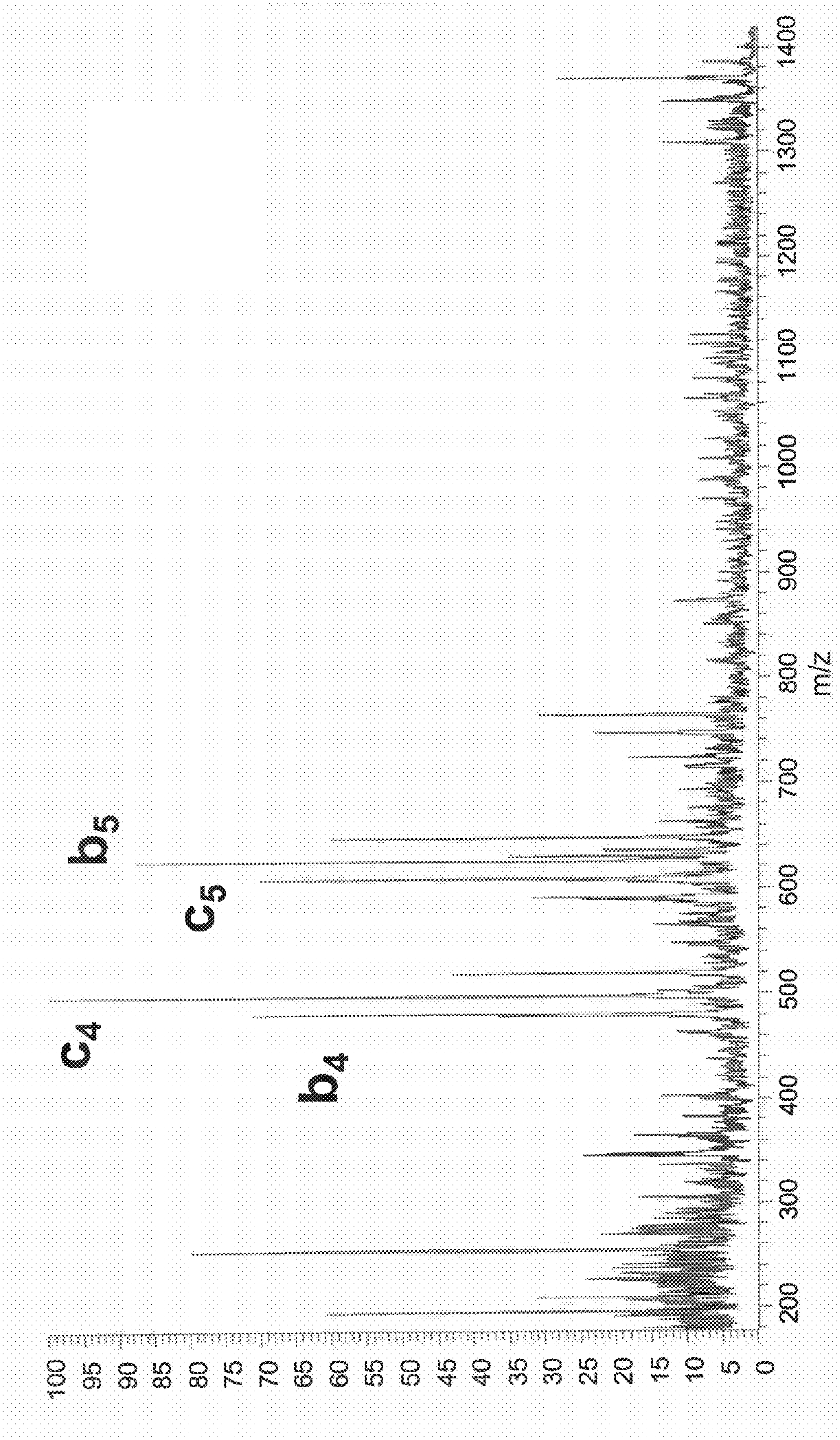
FIG. 5 is a fragment ion mass spectrum of substance P obtained in accordance with this invention.
Figure 6:
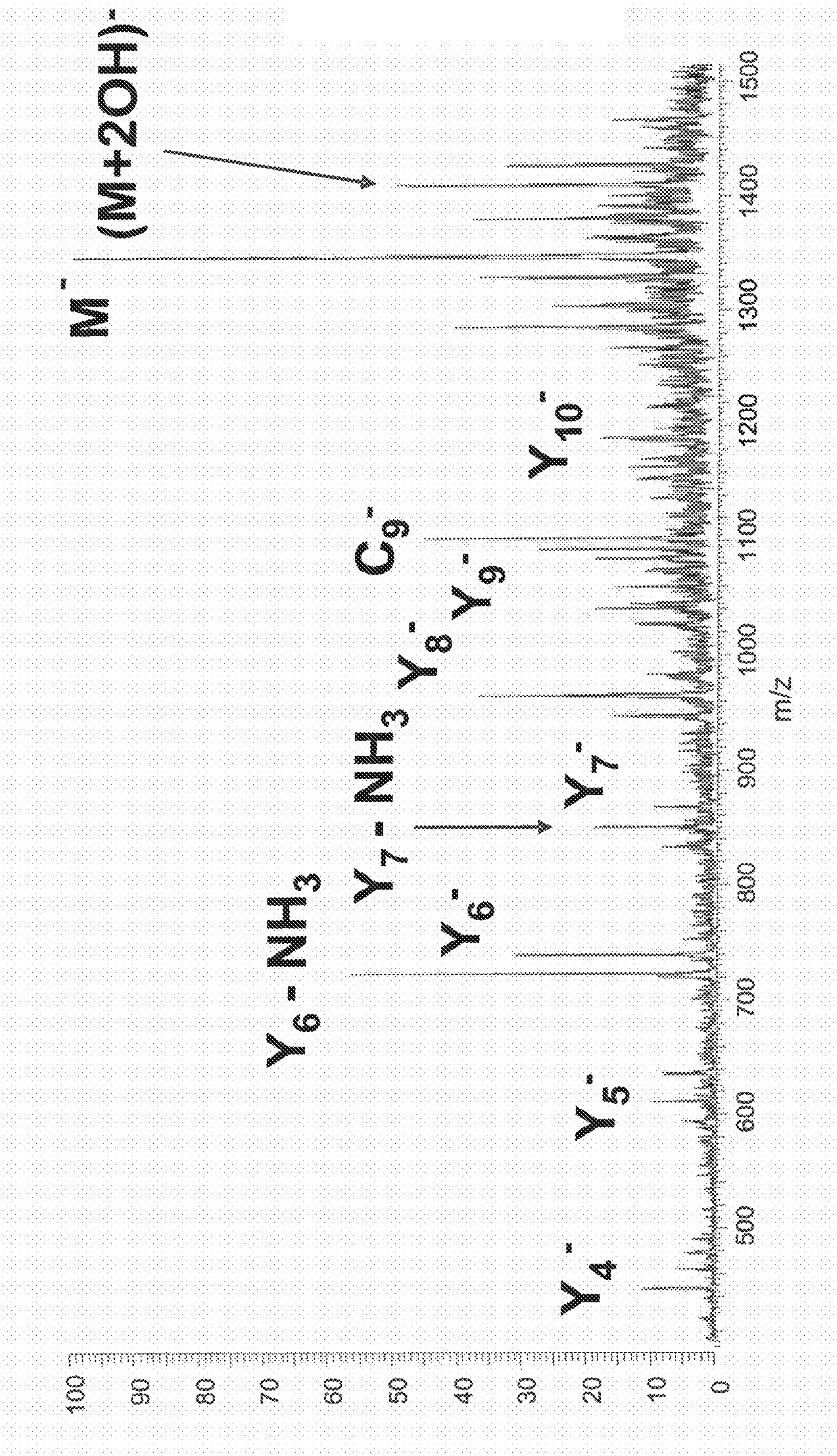
FIG. 6 illustrates a fragment ion mass spectrum of substance P obtained in accordance with this invention.

FIG. 5 is a fragment ion mass spectrum of substance P obtained using a three-dimensional ion trap as the mass spectrometer from a single mass scan. The corona discharge and electrospray had positive polarity. The flow reactor was maintained at the temperature of 420° C. The flow of the carrier gas (pure nitrogen with an addition of $H_2O_2$ vapor) through the radical source was 280 cubic centimeters per minute FIG. 6 is a fragment ion mass spectrum of Bradykinin obtained according to one of the methods of this invention in a three-dimensional ion trap in a single scan. The corona discharge and electrospray had positive polarity. The flow reactor was maintained at the temperature of 400° C. The flow of the carrier gas (pure nitrogen an addition of $H_2O_2$ vapor) through the radical source was 250 cubic centimeters per minute.

The fragmentation patterns observed (FIG. 4, 5 and 6) contain c-type fragments that are specific to ECD/ETD along with the y-/b-fragments that are specific to CAD, with dominating c- and b-fragments. In a suggested mechanism for fragmentation, the fragmentation is caused by hydroxyl radicals that are common products of corona discharge. The likely source of hydroxyl radicals in the corona discharge is water in which the hydroxyl radicals are produced via a reaction between water and high-energy species produced in the corona discharge. In a typical experiment, ESI is the source of water vapor (FIG. 4). Adding water ($H_2O$) or hydrogen peroxide ($H_2O_2$) vapors directly to the gas flowing through the corona discharge dramatically increases (at least 100 fold) the intensity of the fragments (FIG. 5).

Figure 7:
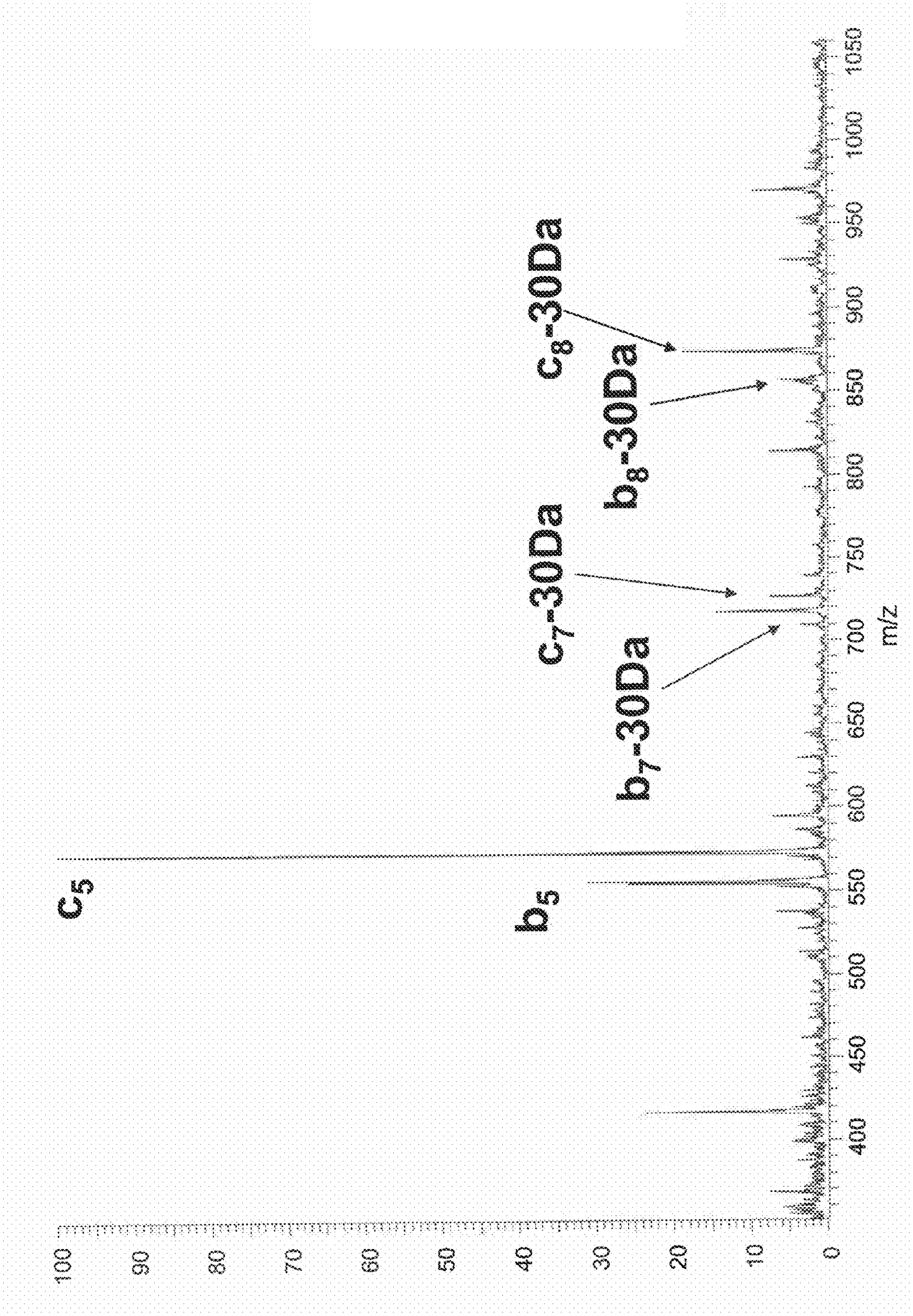
FIG. 7 is a fragment ion mass spectrum of Bradykinin obtained in accordance with this invention.

FIG. 7 illustrates a fragment ion mass spectrum of substance P obtained according to one of the methods of this invention in a three-dimensional ion trap in a single scan. The corona discharge had a positive polarity, and the electrospray ionization had a negative polarity. The flow reactor was maintained at the temperature of 420° C. The flow of the carrier gas (pure nitrogen with an addition of $H_2O_2$ vapor) through the radical source was 280 cubic centimeters per minute.

In the negative ESI mode, the fragmentation pattern observed also contain c-type fragments specific to ECD/ETD and the y-/b-fragments specific to CAD, with the domination of y- and sometimes c-fragments.

In general, these results show that, in both positive and negative ESI modes, the fragment ion spectra demonstrate mixed ECD/ETD-type and CAD-type fragmentation patterns. The degree of the fragmentation will depend on the temperature of the flow reactor along with gas flow (usually ~280 cc/min) and the current through corona discharge (typically 200 μA), but seems independent of the corona discharge polarity.

Analyte Processing

Figure 8:
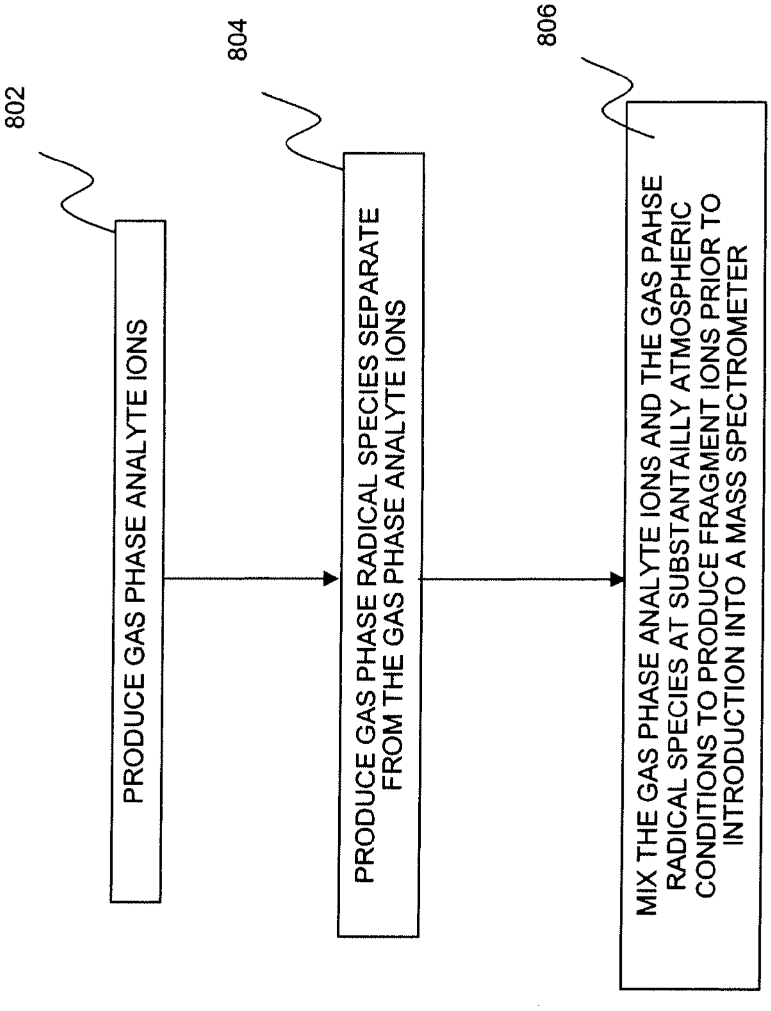
FIG. 8 is a flowchart describing one method of the invention.

FIG. 8 is a flowchart describing one method of the invention for the fragmentation of analyte ions in a mass spectrometer. At 802, gas-phase analyte ions are produced. At 804, gas-phase radical species are produced separately from the analyte ions. At 806, the gas-phase analyte ions and the radical species are mixed at substantially atmospheric pressure conditions to produce fragment ions prior to introduction into a mass spectrometer.

At 802, the gas-phase analyte ions can be produced by one or more of electrospray ionization, atmospheric pressure chemical ionization, photoionization, and atmospheric pressure matrix-assisted laser desorption ionization. For example, while FIGS. 1-3 all show the use of electrospray ion source 20 to produce the gas-phase analyte ions, other ion sources including but not limited to those listed above can be suitably used. The gas-phase analyte ions from these sources can have a positive polarity or a negative polarity. A source of the gas-phase analyte ions as discussed above can come from proteins, peptides, DNA, RNA, lipids, polysaccharides, and metabolite products introduced for example through the 2.5 kV needle shown in FIGS. 1 and 2.

At 804, the gas-phase radical species can be generated by electrical discharge by which final or intermediate products of chemical reactions caused by the electrical discharge can be extracted as the gas-phase radical species. For example, while FIGS. 1 and 3 show the use of a corona discharge to produce the gas-phase radical species, other radical species sources can be suitably used including but not limited to a microwave discharge, an inductively-coupled RF discharge, a capacitively-coupled RF discharge, and a glow discharge. Further, the gas-phase radical species can be generated photoionization, as shown in FIG. 2 where UV lamp 32 can be used to generate radical species from a carrier gas being directed to the reaction chamber 40 The radical species from these sources can be one of neutral radical species and ionic radical species. Suitable radical species include reactive oxygen-containing species, such as for example singlet oxygen radicals ($^1O_2$), hydroxyl radicals (OH), hydrogen peroxide radicals ($H_2O_2$), and superoxide anions ($O_2^-$).

At 806, the gas-phase analyte ions and the radical species can be mixed fro example in the reaction chamber 40 at pressures between 0.1 Torr and 10 Torr, or 10 Torr and 100 Torr, or between 100 Torr and 1 atmosphere, or above 1 atmosphere (for example, 1-10 atm.).

In one embodiment of the invention, additional energy can be supplied to the analyte ions. The additional energy can be supplied after a mixing with gas-phase radical species, or preceding mixing with the gas-phase radical species. The additional energy can be supplied to intermediate products formed in the interaction of the analyte ions with the radical species.

The additional energy can be supplied in the form of photoactivation. For example, a window (not shown) can be added to reaction chamber 40 to facilitate the irradiation of gas in reaction chamber 40 with laser light or UV light. The additional energy can be supplied in the form of by collisions with background gas having an elevated temperature, using for example the ring heaters shown in FIG. 1 to heat the gas in the reaction chamber 40. The background gas can be at temperatures less than 100° C., or between 100° C. and 300° C., or above 300° C. The use of temperatures more than 500° C. typically leads to ion decomposition due to the heat and would be only useful in certain circumstances.

In one embodiment of the invention, particular analyte ions are selected using at least one of gas-phase and liquid-phase chromatography, or are selected using at least on of ion mobility and field-asymmetric ion mobility methods. The selection occurs before mixing the selected analyte ion with the radical species, as shown by example in FIG. 3.

In one embodiment of the invention, after mixing of the gas-phase analyte ions and the radical species at substantially atmospheric pressure conditions to produce fragment ions, mass to charge ratios of the fragment ions are measured in a mass spectrometer, such as for example by mass spectrometer 50 shown in FIGS. 1-3.

Numerous modifications and variations of the present invention are possible in light of the above teachings. It is, therefore, to be understood that within the scope of the accompanying claims, the invention may be practiced otherwise than as specifically described herein.

The invention claimed is:

1. A method for fragmentation of analyte ions for mass spectroscopy, comprising:

producing gas-phase analyte ions;

producing gas-phase radical species separately from the analyte ions; and mixing said gas-phase analyte ions and said radical species at substantially atmospheric pressure conditions to produce fragment ions prior to introduction into a mass spectrometer.

2. The method according to claim 1, wherein producing gas-phase analyte ions comprises producing the analyte ions by electrospray ionization.

3. The method according to claim 1, wherein producing gas-phase analyte ions comprises producing the analyte ions by atmospheric pressure chemical ionization.

4. The method according to claim 1, wherein producing gas-phase analyte ions comprises producing the analyte ions by photoionization.

5. The method according to claim 1, wherein producing gas-phase analyte ions comprises producing the analyte ions by atmospheric pressure matrix-assisted laser desorption ionization.

6. The method according to claim 1, wherein producing gas-phase analyte ions comprises producing analyte ions of a positive polarity.

7. The method according to claim 1, wherein producing gas-phase analyte ions comprises producing analyte ions of a negative polarity.

8. The method according to claim 1, wherein producing gas-phase analyte ions comprises providing as a source of the gas-phase analyte ions at least one of proteins, peptides, DNA, RNA, lipids, polysaccharides, and metabolite products.

9. The method according to claim 1, wherein producing gas-phase radical species comprises generating the radical particles by electrical discharge.

10. The method according to claim 9, further comprising:

producing final or intermediate products of chemical reactions caused by the electrical discharge.

11. The method according to claim 9, wherein generating the radical particles by electrical discharge comprises generating the radical particles from at least one of a microwave discharge, an inductively-coupled RF discharge, a capacitively-coupled RF discharge, a glow discharge, and a corona discharge.

12. The method according to claim 1, wherein producing gas-phase radical species comprises generating the radical particles by photoionization.

13. The method according to claim 1, wherein producing gas-phase radical species comprises producing neutral radical species.

14. The method according to claim 1, wherein producing gas-phase radical species comprises producing ionic radical species.

15. The method according to claim 1, wherein producing gas-phase radical species comprises producing reactive oxygen-containing species.

16. The method according to claim 15, wherein producing gas-phase radical species comprises producing singlet oxygen radicals ($^1O_2$).

17. The method according to claim 15, wherein producing gas-phase radical species comprises producing hydroxyl radicals (OH).

18. The method according to claim 15, wherein producing gas-phase radical species comprises producing hydrogen peroxide radicals ($H_2O_2$).

19. The method according to claim 15, wherein producing gas-phase radical species comprises producing superoxide anions ($O_2^-$).

20. The method according to claim 1, wherein mixing the analyte ions and the radical species comprises mixing at pressures between 0.1 Torr and 10 Torr.

21. The method according to claim 1, wherein mixing the analyte ions and the radical species comprises mixing at pressures between 10 Torr and 100 Torr.

22. The method according to claim 1, wherein mixing the analyte ions and the radical species comprises mixing at pressures between 100 Torr and 1 atmosphere.

23. The method according to claim 1, wherein mixing the analyte ions and the radical species comprises mixing at pressure above 1 atmosphere.

24. The method of claim 1, further comprising:

supplying additional activation energy to the analyte ions.

25. The method according to claim 24, wherein supplying additional activation energy occurs after a mixing with gas-phase radical species.

26. The method according to claim 24, wherein supplying additional activation energy precedes a mixing with gas-phase radical species.

27. The method according to claim 24, wherein supplying additional activation energy comprises supplying the activation energy in the form of photoactivation.

28. The method according to claim 24, wherein supplying additional activation energy comprises supplying the activation energy in collisions with background gas having an elevated temperature.

29. The method according to claim 28, wherein supplying the activation energy in collisions with background gas comprises supplying the background gas at temperatures less than 100° C.

30. The method according to claim 28, wherein supplying the activation energy in collisions with background gas comprises supplying the background gas at temperatures between 100° C. and 300° C.

31. The method according to claim 28, wherein supplying the activation energy in collisions with background gas comprises supplying the background gas at temperatures above 300° C.

32. The method of claim 1, further comprising:

supplying additional activation energy to intermediate products formed in the interaction of the analyte ions with the radical species.

33. The method according to claim 32, wherein supplying additional activation energy comprises supplying the activation energy in the form of photoactivation.

34. The method according to claims 32, wherein supplying additional activation energy comprises supplying the activation energy in collisions with background gas having an elevated temperature.

35. The method according to claim 34, wherein supplying the activation energy in collisions with background gas comprises supplying the background gas at temperatures less than 100° C.

36. The method according to claim 34, wherein supplying the activation energy in collisions with background gas comprises supplying the background gas at temperatures between 100° C. and 300° C.

37. The method according to claim 34, wherein supplying the activation energy in collisions with background gas comprises supplying the background gas at temperatures above 300° C.

38. The method of claim 1, further comprising:

selecting the analyte ions using at least one of gas-phase and liquid-phase chromatography.

39. The method of claim 1, further comprising:

selecting the analyte ions using at least on of ion mobility and field-asymmetric ion mobility methods.

40. A method for acquiring fragment ion spectra, via fragmentation of analyte ions in reactions with radical species, comprising:

generating the analyte ions in a gas phase from a first sample;

generating the radical species in a gas phase from a second sample;

mixing the analyte ions and the radical species at substantially atmospheric pressure conditions to produce fragment ions;

introducing at least part of the fragment ions into a mass spectrometer; and measuring mass to charge ratios of the fragment ions in the mass spectrometer.

41. A system for mass spectroscopy, comprising:

a gas-phase analyte ion source configured to generate gas-phase analyte ions;

a gas-phase radical species source separate from the gas-phase analyte ion source and configured to generate gas-phase radical species;

a mixing region where said gas-phase analyte ions and said radical species are mixed at substantially atmospheric pressure to produce fragment ions of said analyte ions;

a mass spectrometer having an entrance where at least a portion of said fragment ions are introduced into a vacuum of the mass spectrometer; and a detector in the mass spectrometer which determines a mass to charge ratio analysis of the fragment ions.

42. The system according to claim 41, wherein the gas-phase analyte ion source comprises an electrospray ionization unit.

43. The system according to claim 41, wherein the gas-phase analyte ion source comprises an atmospheric pressure chemical ionization unit.

44. The system according to claim 41, wherein the gas-phase analyte ion source comprises a photoionization unit.

45. The system according to claim 41, wherein the gas-phase analyte ion source comprises an atmospheric pressure matrix-assisted laser desorption ionization unit.

46. The system according to claim 41, wherein the gas-phase analyte ion source is configured to produce analyte ions of a positive polarity.

47. The system according to claim 41, wherein the gas-phase analyte ion source is configured to produce analyte ions of a negative polarity.

48. The system according to claim 41, further comprising:

a source supply for the gas-phase analyte ions providing at least one of protein, peptide, DNA, RNA, lipid, polysaccharide, and metabolite product.

49. The system according to claim 41, wherein the gas-phase radical source comprises an electrical discharge unit.

50. The system according to claim 49, wherein the electrical discharge unit comprises at least one of a microwave discharge, an inductively-coupled RF discharge, a capacitively-coupled RF discharge, a glow discharge, and a corona discharge.

51. The system according to claim 41, wherein the gas-phase radical species source comprises a photoionization unit.

52. The system according to claim 41, wherein the gas-phase radical species source is configured to produce neutral radical species.

53. The system according to claim 41, wherein the gas-phase radical species source is configured to produce ionic radical species.

54. The system according to claim 41, wherein the gas-phase radical species source is configured to produce reactive oxygen-containing species.

55. The system according to claim 54, wherein the gas-phase radical species source is configured to produce singlet oxygen radicals ($^1O_2$).

56. The system according to claim 54, wherein the gas-phase radical species source is configured to produce hydroxyl radicals (OH).

57. The system according to claim 54, wherein the gas-phase radical species source is configured to produce hydrogen peroxide radicals ($H_2O_2$).

58. The system according to claim 54, wherein the gas-phase radical species source is configured to produce superoxide anions ($O_2^-$).

59. The system according to claim 41, wherein the mixing region comprises a pressure region between 0.1 Torr and 10 Torr.

60. The system according to claim 41, wherein the mixing region comprises a pressure region between 10 Torr and 100 Torr.

61. The system according to claim 41, wherein the mixing region comprises a pressure region between 100 Torr and 1 atmosphere.

62. The system according to claim 41, wherein the mixing region comprises a pressure region above 1 atmosphere.

63. The system according to claim 41, further comprising:

an additional activation energy source configured to supply additional activation energy to at least one of the analyte ions and intermediate products formed in the interaction of the analyte ions with the radical species.

64. The system according to claim 63, wherein the additional activation energy source comprises a light source for photoactivation.

65. The system according to claim 63, wherein the additional activation energy source comprises a background gas heater configured to elevate a temperature of a background gas.

66. The system according to claim 65, wherein the background gas heater is configured to supply the background gas at temperatures less than 100° C.

67. The system according to claim 65, wherein the background gas heater is configured to supply the background gas at temperatures between 100° C. and 300° C.

68. The system according to claim 65, wherein the background gas heater is configured to supply the background gas at temperatures between 300° C. and 500° C.

69. The system according to claim 41, further comprising:

at least one of a gas-phase unit and a liquid-phase chromatography unit configured to select the analyte ions.

70. The system according to claim 41, further comprising:

at least one of an ion mobility unit and a field-asymmetric ion mobility unit configured to select the analyte ions.

* * * * *